Figure 4:
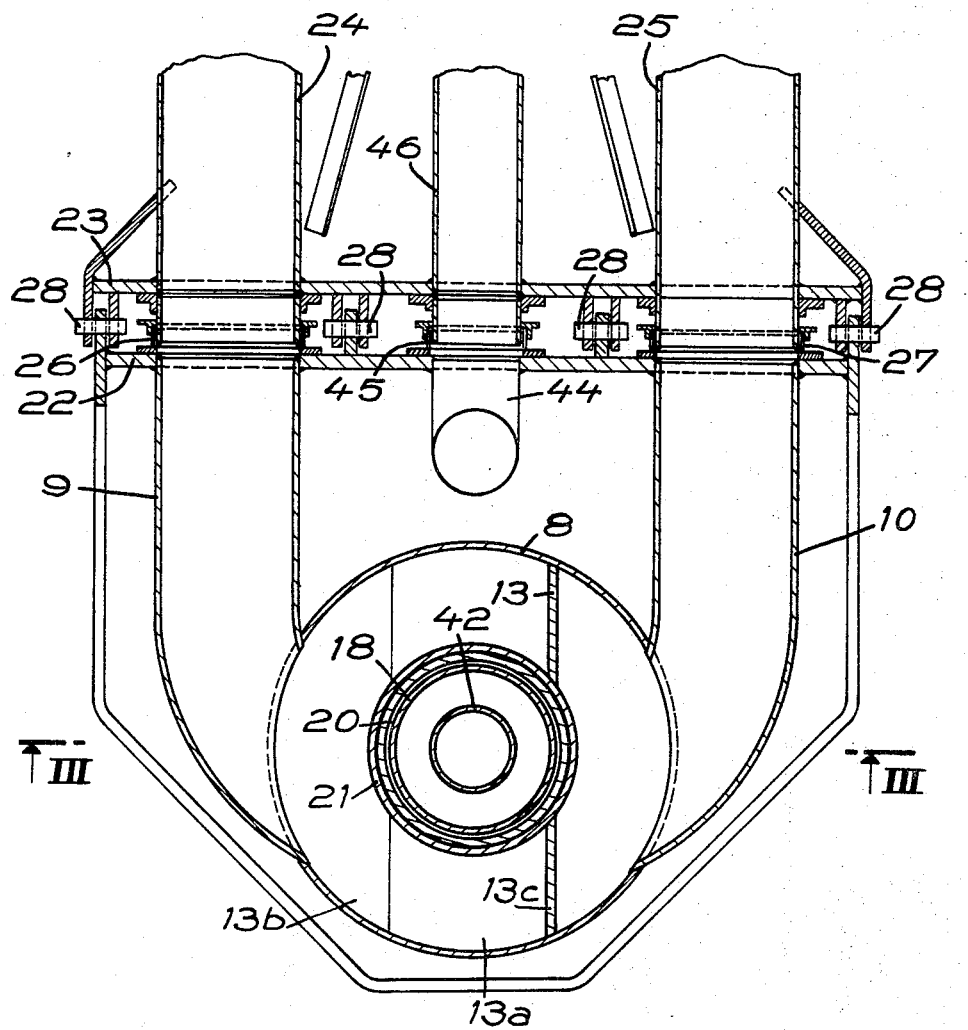

United States Patent [19]
Van Hulstijn et al.

[11] 3,838,720
[45] Oct. 1, 1974

[54] ROTATABLE DISTRIBUTORS

[75] Inventors: Hendrik Van Hulstijn, Maisons Laffitte; Henri Graton, Herblay, both of France

[73] Assignee: Compagnie Generale D'Equipement Maritime Hersent, Paris, France

[22] Filed: Jan. 30, 1973

[21] Appl. No.: 328,024

[30] Foreign Application Priority Data
Feb. 3, 1972  France .............................. 72.03671

[52] U.S. Cl. .................... 141/387, 9/8 P, 141/100, 285/134, 285/136
[51] Int. Cl. ..................... B65b 3/04, F16l 39/04
[58] Field of Search ............. 9/8 P, 8 R; 114/.5 R, 114/.5 BD, 230; 137/236, 236.5; 141/387, 141/388, 279, 284, 285, 100; 285/133 A, 285/133 R, 134, 136

[56] References Cited
UNITED STATES PATENTS

| | | | |
|---|---|---|---|
| 3,258,793 | 7/1966 | Schultz | 9/8 P |
| 3,366,982 | 2/1968 | Sutton | 9/8 P |
| 3,414,918 | 12/1968 | Petrie et al. | 9/8 P |
| 3,586,352 | 6/1971 | Smulders | 285/134 |
| 3,735,435 | 5/1973 | Mikulicic | 9/8 P |

*Primary Examiner*—Houston S. Bell, Jr.
*Assistant Examiner*—Frederick R. Schmidt
*Attorney, Agent, or Firm*—Lewis H. Eslinger, Esq.; Alvin Sinderbrand, Esq.

[57] ABSTRACT

This invention relates to rotatable distributors for fitment to a buoy or a tower for the purpose of transferring fluids between a ship and a storage point. As an illustration, the distributor may be used for passing oil between an oil storage plant on shore and an oil tanker. The distributor of the invention comprises a platform on the buoy or tower and carrying a fixed hollow body to which two lower pipes are firmly attached, these pipes being connected to the storage point. This hollow body sealingly supports a rotating dome to which are attached at least two lateral pipes connectable to the ship, and the body has an internal cavity into which all the four pipes open. An oblique partition is firmly attached to the dome to define upper and lower chambers in the cavity and the two lateral pipes afore-mentioned are respectively connected to these two chambers. The lower chamber thus provides a permanent communication between the corresponding lateral pipe and one of the lower pipes afore-mentioned. An inner passage is firmly attached to the body and extends coaxially and within the dome and it moreover passes through a sealing gland in the partition to provide a communication between the other one of the lower pipes afore-mentioned and the upper chamber into which the appropriate lateral pipe opens. Thus, any conduits connected to the lateral pipe and the one lower pipe and between the other lateral pipe and the other lower pipe may be isolated one from the other.

12 Claims, 4 Drawing Figures

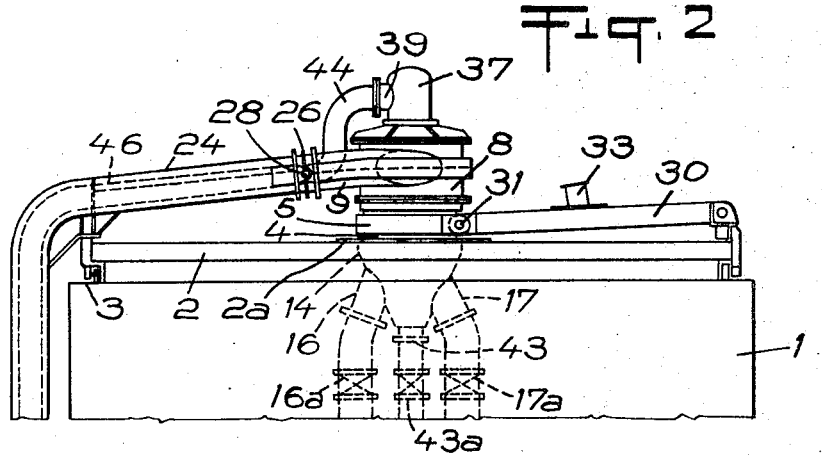
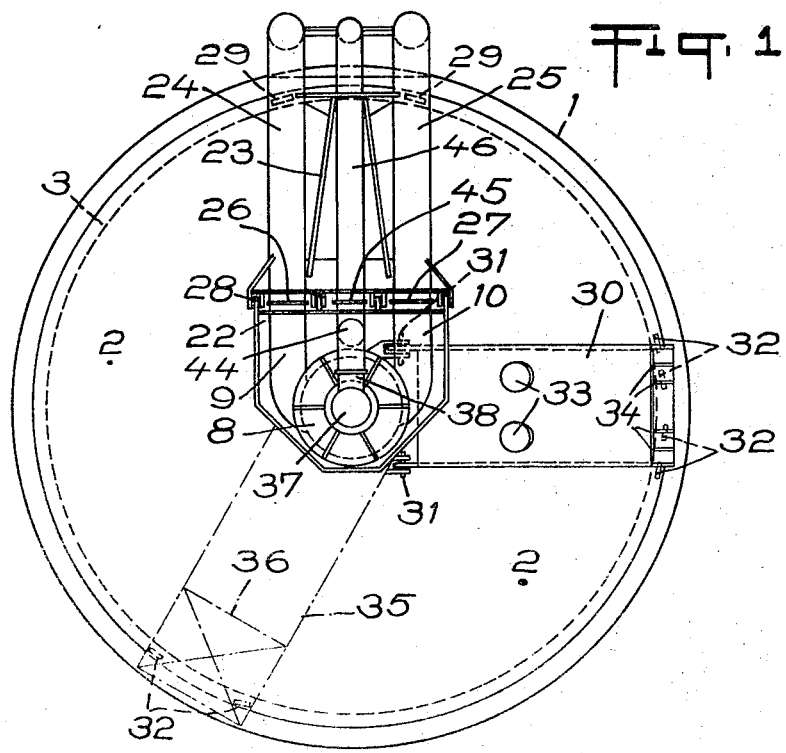

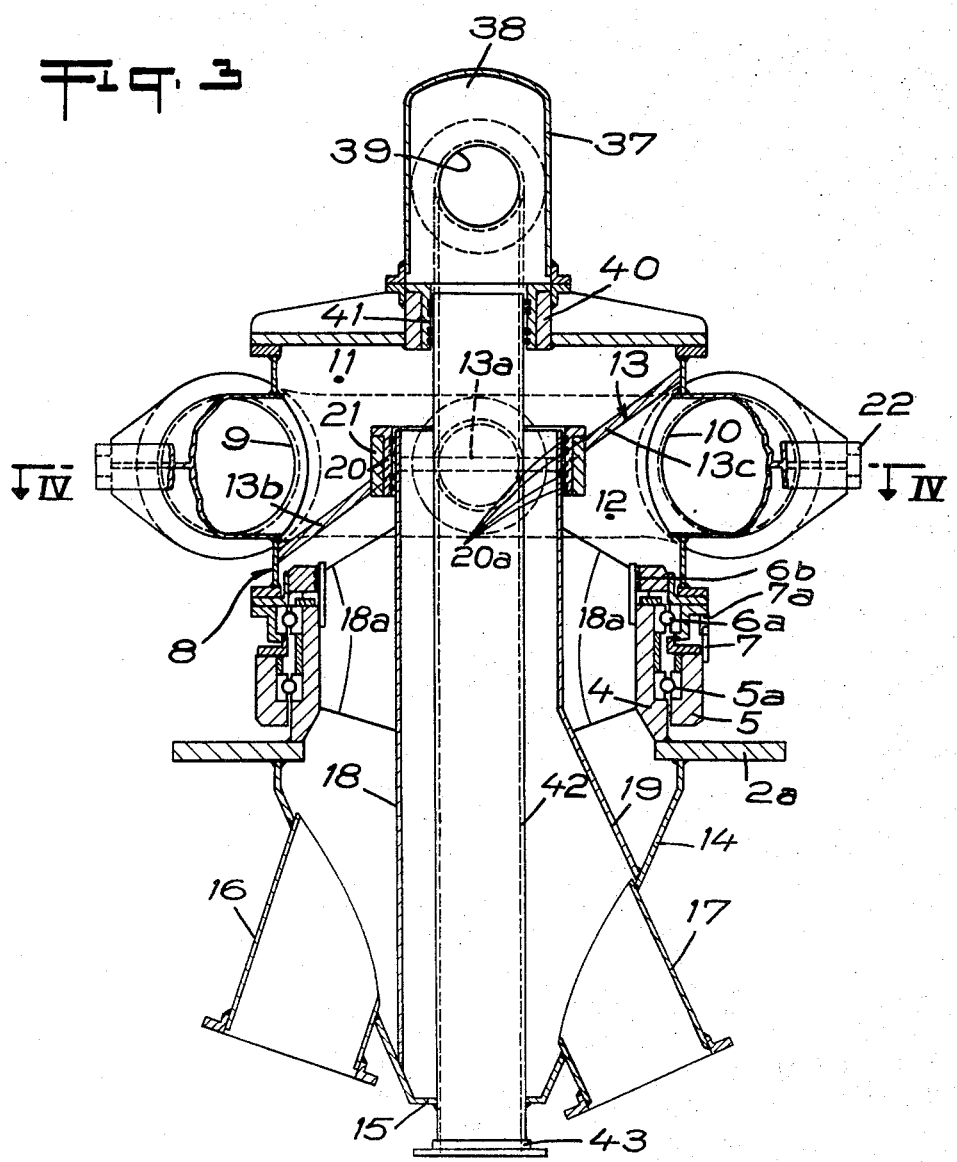

ROTATABLE DISTRIBUTORS

The present invention relates to a rotatable distributor for a buoy or a tower enabling at least one fluid to be transferred between a ship and a storage point.

Known rotatable distributors generally comprise:

a. a hollow base or body solidly fixed to the buoy or the tower and fitted with pipes for connecting permanent, rigid or flexible ducts to the storage point, and b. a dome mounted to rotate on the fixed body and including sealed chambers each provided with a pipe to connect it, by means of a hinged joint and a rigid conduit, to a preferably flexible and buoyant duct, placed in position for the duration of the operation, which terminates at the ship.

These rotatable distributors have a first serious drawback, viz. when the distributor has only one chamber for the fluid being transferred to pass through while the fluid flows through several ducts, if one of the latter breaks upstream or downstream of the distributor it is necessary to be able to isolate the damage circuit by means of valves located at the input and output of the distributor so as to avoid interrupting the transfer.

This drawback becomes more serious when there is an expansion joint between the chamber and the output valve concerned. In effect, in this case, if the joint breaks, all the circuits passing through the common chamber must be considered unusable.

Furthermore, known rotatable distributors have a have a second major drawback, viz:- generally, the rigid conduits referred to above are fixed, at the inner end, to a support welded to the platform of the buoy or the tower or to a rotating arm. When the diameter of the conduit becomes large, the internal pressure of the fluid exerts a relatively high strain which, being at right angles to the expansion joint, whether this is mounted directly on the rotating part or on the adjacent valve, has to be absorbed by the support or the arm because of the flexibility of the expansion joint and of that of its supporting member this strain leads to a deformation such as may frequently result in damage to or rupture of the expansion joint.

Known rotatable distributors have a third drawback deriving from the fact that their overall height may be very great if the number and diameter of the ducts are large because of the necessity in these prior constructions to arrange the chambers one above the other.

It is an object of the invention to provide a distributor which enables all these drawbacks to be overcome or minimised and enables highly significant advantages to be gained.

The invention consists in that the internal cavity of the hollow body is divided, at the common level of at least two lateral pipes, into at least two chambers by an oblique partition firmly attached to the dome, the first chamber providing direct communication between one lateral pipe and a lower pipe, while the second chamber connects the other lateral pipe to the other lower pipe by means of an internal duct extending coaxially to the dome and passing through a sealing gland in the partition.

Because each duct has its own chamber, the various circuits are completely separated from one another; a single valve is thus sufficient to isolate any of them for repair purposes; the result of this is that the distributor can operate uninterruptedly under all circumstances, in which case the apparatus is more economically employed.

Furthermore, by reason of the oblique nature of the deflecting partition separating the chambers, the lateral pipes may be arranged at the same level; this results in a considerable reduction in the overall height of the distributor.

In this connection, it is important to point out that, on the one hand, if the diameter of the ducts is not too great, it is still possible to arrange a plurality of lateral pipes at the same level and to divide off an equal number of internal chambers with the partition, and that, on the other hand, if the flow section is considerable and if the number of large diameter ducts is greater than two, it is also possible to place pairs of pipes and pairs of chambers one above the other.

In these various cases in which the installation includes more than two circuits the distributor has concentric tubes terminating at the chambers which they are respectively to connect to the lower pipes.

The possible uses and the variations in use are thus augmented; manufacture, handling, and maintenance of the installation are both simplified, made more economical, and improved.

Furthermore, the ducts into which the lateral pipes extend may be connected together to form a rigid assembly and their end-flanges located in the same plane so that their centres are in line; furthermore, the conduits coupled to the ducts may be connected together to form a rigid arm resting with its peripheral end on a circular track on the platform. It is important to note that the hinge pins of the joints joining the ducts to the conduits are mutually aligned and coincide substantially with the axis of pivot of the arm so formed to the dome.

As soon as this occurs the tendency of the internal pressure to dislocate the joints is cancelled out and the risk of damage to the latter is considerably reduced.

According to another important feature of the invention, a mooring arm for the ship may be mounted to pivot on the rotating assembly in a direction at right angles to the axis of revolution of the dome so that it rests with its free end on the circular track mentioned above, so that the ducts follow the ship when it moves around the anchoring point. The dome may be mounted to rotate on the body by means of a bearing which resists mainly axial stresses, while a collar carrying the mooring arm is mounted to rotate about the body by means of a bearing resisting mainly radial stresses, the dome being connected to the collar by means of a sliding coupling.

Under these conditions the operation of the dome cannot be affected by the strains exerted by the ship on the buoy or the tower, the result being greater strength, firmness and reliability and better sealing for the distributor.

Various other features and advantages of the invention appear in the detailed description which follows, and in order that the invention may be more clearly understood, one embodiment thereof is shown by way of non-limiting example in the accompanying drawings, in which:

FIG. 1 is a plan view showing a buoy employing a distributor according to the invention, FIG. 2 is an elevation corresponding to FIG. 1 but in which the arm carrying the conduits is imagined to be brought down to the plane of the mooring arm, FIG. 3 is a sectional elevation along line III—III of FIG. 4 illustrating the distributor, certain hidden components of which have not been shown to make the drawing easier to understand, and FIG. 4 is a section along line IV—IV of FIG. 3.

Referring now to the drawings, as FIGS. 1 and 2 show, the buoy comprises a floating caisson 1 anchored to the bed of the expanse of water in which the buoy is located.

Whether it is this buoy which is concerned or whether it is a tower, which could be installed in its place, the structure out of the water has an upper platform 2 associated in the circular movement track 3 centred on a collar 2a.

The collar 2a is firmly attached to the platform 2 and, by reason of its relatively fixed position, is used as a holding member for a central body 4 associated with the distributor.

As can be clearly seen from FIGS. 3 and 4, the tubular body 4 supports a mooring collar 5 through the medium of a bearing, such as a ball-race 5a, which resists mainly radial stresses. This body 4 also supports, through the medium of a bearing which resists mainly axial stresses, such as a ball-race 6a, a rotating dome 8, a sealing gland 6b being interposed between the body 4 and this dome.

Assuming that the radial stresses transmitted by the hawsers of the ship to the collar 5 are supported solely by the body 4, they cannot be transmitted to the rotating dome 8, which is then only subjected to the axial pressure resulting from the pressure of the fluid flowing through the distributor and from the weight of the rotating assembly. In order that this particularly advantageous feature may be retained when the dome 8 has to follow the collar 5 in its angular movement, the said collar is connected to the said dome by means of a sliding coupling. In the example shown, this coupling is formed by a peg 7 firmly attached to the collar and extending between the arms of a fork 7a depending from the dome 8 in a direction parallel to the axis of rotation.

This dome 8 is firmly attached to two angled pipes 9 and 10 which open, at two diametrically opposed points, into two internal chambers 11 and 12 in this dome, these chambers being separated by a partition 13. The partition 13 has a median core 13a which is firmly attached to a central cylindrical sleeve 21 and which extends substantially in the horizontal plane of symmetry of the pipes 9 and 10 and is elongated into two oblique flaps 13b, 13c, these flaps forming deflectors directing the fluid in chambers 11 and 12 into tubes 9 and 10 respectively.

The fixed body 4 extends into a Frustro-conical underpiece 14 extending beneath the collar 2a. The underpiece 14, which is closed off by a bottom 15, is firmly attached to the collar 2a, and to two pipes 16 and 17 which extend obliquely downwards, and also to an internal passage 18. The latter is arranged coaxially with, and inside, the body 4; at its lower end, it is welded to the underpiece 14 in such a way that the pipe 17 opens into a lateral enlargement 19 of this passage; it is joined to the fixed body 4 by gusset plates 18a and, at its upper end, it passes A fluid may thus flow between the pipes 9 and 17 by passing through the chamber 11 which is defined by the upper part of the dome 8, the partition 13, the passage 18 and its enlargement 19, while another fluid, which may be identical to or different from the previous one, may flow between the pipes 10 and 16 by passing through the chamber defined around the passage 18 by the partition 13, the lower part of the dome 8 the body 4 and the underpiece 14. Once this happens, the partition 13 effectively isolates the chambers and separates the fluids conveyed in the distributor.

The lower pipes 16 and 17 are connected, by means of valves 16a, 17a and flexible ducts (not shown), to the storage point, while the lateral pipes 9 and 10 are connected directly to the ship by means of flexible ducts (not shown).

To connect up the pipes 9 and 10 a particular arrangement is also made use of. In effect, the angled ducts into which these pipes extend are joined together (FIGS. 2 to 4), and to the dome 8, by plates, gusset-plates, and fittings 22 to make up a rigid assembly forming an integral part of the said dome. These angled ducts are, however, adapted so that their ends are situated in the same tangential plane. Furthermore, other plates and fittings 23 (FIG. 1, 2 and 4) connect together two conduits 24 and 25 which extends parallel to one another in a sustantially radial direction and as extensions of the ducts mentioned above to form a rigid, hinged assembly comparable to a supporting arm. In effect, the ends of these ducts are connected to the corresponding ends of the conduits by means of hinged joints 26 and 27. Furthermore, the arm 23 to 25 is mounted to pivot at a tangent relative to the dome 8 and, to this end, pivot pins 28 provide a link between the assembly 9, 10, 22 and the arm 23 to 25. It is important to note that the pivot pins 28 line up with the axes of articulation of the joints 26 and 27. Due to the symmetry thus achieved, the latter are subjected to minimal stresses, under the most favourable conditions, when they are moved.

At the opposite end, the arm 23 to 25 is fitted with rollers 29 which rest on the track 3 associated with the platform 2 of the buoy. The conduits 24 and 25 are angled downwards at the outside of the buoy (FIG. 2) and are coupled to the flexible ducts mentioned above which terminate at the ship.

Furthermore, a mooring arm 30 (FIGS. 1 and 2), which may be replaced by two symmetrical members, is arranged radially at one side of the arm 23 to 25. In the example shown it extends in a direction substantially at right angles. It is, in any case, mounted in the same way as the arm 23 to 25 except, of course, that it is coupled to the collar 5. To this end, it is hinged to the latter, by means of pins 31 which are at right angles to the axis of rotation of the dome and is located substantially at the level of the ballrace 5a (FIG. 3). At the free end, it is fitted with rollers 32 resting on the track 3 of platform 2 (FIGS. 1 and 2). At right angles to these rollers, it is equipped with two clinches 34 enabling hawsers to be attached to moor the ship and, if desired, with bollards 33 to facilitate manoeuvring. Due to the peg 7 and the fork 7a, the dome 8 follows the mooring arm 30 in its rotational movements.

In the case shown, in which a buoy is equipped with the apparatus, the rotating assembly must be balanced.

To this end, another arm 35 (FIG. 1) extends in an opposite direction to the two previous ones, substantially in the plane of the resultant of the loads from the arms 23 to 25 and 30. This arm 35 is mounted in the same way except that it is coupled to the collar 5 by means of pivot pins which are at right angles to the axis of rotation; the arm 35 also rests on the track 3 by means of rollers 32 and carries a counter weight 36 which balances the system.

It is quite obvious that a fluid, which may be identical or different to the other fluid or fluids, may also be transferred through a third duct of smaller crosssection. In this case, the dome 8 is surmounted by a small auxiliary dome 37 enclosing a third chamber 38 into which open, on the one hand, a lateral pipe 39 and, on the other hand, a sleeve 40 firmly attached to the top of the dome 8. This sleeve 40 is fitted with a removable sealing gland 41 surrounding the upper end of a fixed pipe 42 extending coaxially with, and within, the passage 18 and passing through the bottom 15 of the underpiece 14 to which it is firmly attached; the lower end of the conduit 42 forms a connecting pipe 43 for a flexible duct terminating at the storage point, this pipe, like the others, being equipped with an isolator valve 43a for the corresponding circuit.

The lateral pipe 39 extends into a double angle 44 which is rigidly connected to the ducts into which the other lateral pipes 9 and 10 extend by the plates, gussets-plates, and fittings 22 mentioned above. The end of the double angle 44 is situated in the same tangential plane as that of the said ducts and the centres of these three ends are in line. In a similar way, the fittings and plate 23 connect the pipes 24 and 25 hereinabove referred to rigidly to another pipe 46 which extends between them as an extension of the double angle 44. A hinged joint 45 is then interposed between the end of the latter and of the pipe 46, which are opposite each other, its axis of articulation being consequently in line with those of the other joints and with the pivot pins 28. The free end of the pipe 46 is angled downwards at the outside of the buoy to be connected to the corresponding flexible duct leading to the ship.

It will be apparent from the foregoing that a plurality of pairs of chambers 11 and 12 may be placed one above the other. In this case, the ducts into which the superimposed lateral pipes extend are angled in order to lead, under the conditions detailed above, to hinged joints which are in line with the pivot pins 28 and which connect them to an equal number of conduits belonging to the arm 23 to 25; furthermore, the superimposed chambers communicate, independently of one another, with corresponding, valve-equipped lower pipes by means of concentric tubes extending coaxially with the body 4. Naturally, the chambers into which pipes on the same level open are separated from one another by oblique partitions 13, and from those which correspond to lateral pipes on different levels by diametrical partiations.

The invention is not limited to the embodiment shown and described in the foregoing since various modifications may be made without departing from its scope as defined by the appended claims.

A distributor according to the invention may be used in all cases where a ship is to be moored to a buoy or to a tower at some distance from quays or the shore and where one or more fluids are to be transferred by means of the latter between the ship and a storage point, assumed to be a tank, or a transportation, delivery or a direct-use circuit.

A particularly significant application may be the loading and unloading of tank-ships and particularly petrol tankers, and gas and mineral transporters, for example.

We claim:
1. A rotatable fluid distributor adapted to be mounted on a support structure for transferring at least one fluid between a ship and a storage point, comprising,
   a. a platform mounted on said support structure,
   b. a hollow body rigidly mounted on said platform,
   c. two lower pipes firmly attached to said hollow body in fluid communication with the interior of said hollow body and adapted to be connected in fluid communications with said storage point,
   d. a hollow dome, means for rotatably mounting said dome on said hollow body in fluid tight relation therewith,
   e. at least two laterally extending pipes rigidly secured to said dome in fluid communication with the interior of the dome and adapted to be connected in fluid communication to the ship by ducts; said laterally extending pipes being situated at substantially the same level,
   f. said dome and said hollow body being in fluid communication to define an internal cavity therebetween all of said pipes being in fluid communication with said cavity,
   g. an oblique partition rigidly secured to said dome on the interior thereof within said cavity and separating said cavity into lower and upper chambers, one of said laterally extending pipes and one of said lower pipes being connected to said lower chamber, whereby, said lower chamber provides a permanent fluid communication between said one laterally extending pipe and said one lower pipe, and

1. means for providing an inner fluid passage firmly attached to said body and extending coaxially with, and within, said cavity through said partition into said upper chamber, sealing gland means in said partition surrounding said passage means for providing a liquid tight seal between said passage means and said partition thereby to keep said upper and lower chambers isolated from each other; said passage means being in fluid communciation communication the other lower pipe and said upper chamber, into which the other of said laterally extending pipes opens, whereby fluid supplied to said distributor through the respective laterally extending pipes is kept separated in said cavity by said partition and passage means and directed only to the lower pipe associated with a respective laterally extending pipe.

2. A distributor according to claim 1, wherein said hollow body includes a lower portion extending beneath said platform, said lower portion of said body being formed by a substantially frustro-conical underpiece, said lower pipes being connected obliquely to said underpiece, and said inner fluid passage means having a lateral enlargement into which said other of said lower pipes opens in fluid communication.

3. A rotatable distributor according to claim 2 including,
   a. means defining a third hollow chamber in said dome isolated from said upper chamber,
   b. a third lateral pipe connected in fluid communication with said third chamber, c. a third conduit extending coaxially with, and within, said inner fluid passage means and connected in fluid communication with said third chamber; a sealing gland surrounding said third conduit at its point of connection to said means defining said third chamber to provide a fluid tight seal isolating said third chamber from said upper chamber;

d. said third conduit projecting through said underpiece to the exterior of said body and defining a third lower pipe.

4. A rotatable distributor according to claim 3, wherein said three lateral pipes include flanges situated in the same plane and with their centres in line.

5. A rotatable distributor according to claim 4, including
 a. a conduit-carrying rigid arm comprising at least in part, a plurality of conduits adapted to be connected to said ducts connecting said chambers to the ship,
 b. pivot means for connecting said rigid arm to said dome and having a pivot axis located at right angles to the axis of rotation of said dome,
 c. sealed hinged joints connecting said conduits in fluid communication to said pipes, the axes of articulation of said joints coinciding substantially with the pivot axis of said pivot means;
 d. a circular movement track firmly attached to the platform; and means for movably supporting said arm on said track.

6. A rotatable distributor according to claim 5, and adapted to be mounted on a floating bouy, said distributor including arm means for mooring a ship to the distributor, means for movably supporting said mooring arm on said track, said conduit-carrying arm and said mooring arm form an angle between them; said distributor including a balancing arm arranged in the excluded angle of said two first-mentioned arms, and a counter weight mounted on said balancing arm to hold said platform substantially horizontally.

7. A rotatable distributor according to Claim 1, including
 a. a conduit-carrying rigid arm comprising at least in part, a plurality of conduits adapted to be connected to said ducts connecting said chambers to the ship,
 b. pivot means for connecting said rigid arm to said dome and having a pivot axis located at right angles to the axis of rotation of said dome,
 c. sealed hinged joints connecting said conduits in fluid communication to said pipes, the axes of articulation of said joints coinciding substantially with the pivot axis of said pivot means;
 d. a circular movement track firmly attached to the platform; and means for movably supporting said arm on said track.

8. A rotatable distributor adapted to be mounted on a support structure for transferring at least one fluid between a ship and a storage point, comprising,
 a. a platform mounted on said support structure,
 b. a hollow body rigidly mounted on said support structure,
 c. at least one lower pipe firmly attached to said hollow body and adapted to be connected in fluid communication with said storage point,
 d. a hollow dome, means for rotatably mounting dome on said hollow body in fluid tight relation therewith,
 e. at least one laterally extending pipe rigidly attached to said dome in fluid communication with the interior of the dome and adapted to be connected in fluid communication to the ship by a duct;
 f. said dome and said hollow body being in fluid communication to define an internal cavity therebetween, said pipes being in fluid communication with said cavity,
 g. a conduit-carrying arm comprising, at least in part, a conduit adapted to be connected to said duct connecting said dome to the ship,
 h. pivot means for connecting said arm to said dome and having pivot axis located at right angles to the axis of rotation of said dome,
 i. a sealed hinged joint joining said conduit in fluid communication to said laterally extending pipe, the axis of articulation of said joint coinciding substantially with the pivot axis of said pivot means, and
 j. a circular movement track firmly attached to said platform; and means for movably supporting said arm on said track.

9. A rotatable distributor according to claim 8, including,
 a. an oblique partition rigidly secured to said dome on the interior thereof within said cavity and separating said cavity into a first lateral chamber and a second lateral chamber at the same level in said cavity to which chambers at least two laterally extending pipes are respectively connected, said first chamber providing a permanent fluid communication between a first lateral pipe and a first lower pipe, and
 b. means for providing an inner passage firmly attached to said body and extending coaxially with, and within, said cavity through said partition into said second lateral chamber, sealing gland means in said partition surrounding said passage means for providing a liquid tight seal therebetween, said passage means providing communication between a second lower pipe and the second chamber into which a second laterally extending pipe opens; and
 c. said conduit carrying arm including at least two conduits adapted to be connected to ducts connecting the dome to the ship, and at least two sealed hinged joints joining said two laterally extending pipes to said at least two conduits of said arm, the axes of articulation of said joints coinciding substantially with the pivot axis of said pivot means.

10. A rotatable distributor according to claim 9, wherein said hollow body includes a lower portion extending beneath said platform, said lower portion of the body being formed by a substantially frustro-conical underpiece, said lower pipes being connected obliquely to said underpiece, and said inner fluid passage means having a lateral enlargement into which said second lower pipe opens.

11. A rotatable distributor according to claim 9, and further comprising:
 a. at least a third hollow chamber in said dome and isolated from said lateral chambers,
 b. a third lateral pipe connected in fluid communication to said third chamber, c. a conduit extending coaxially with, and within, said inner fluid passage means and connected in fluid communication with said third chamber, a sealing gland surrounding said third chamber to provide a fluid tight seal isolating said third chamber from said upper chamber;

d. a third lower pipe rigidly secured to said hollow body and adapted to be connected to said storage point; and e. a third sealed hinged joint joining said third lateral pipe to a third pipe of said conduit-carrying arm, the centers of said three joints being in line so that the axes, of articulation of the hinged joints coincide substantially with the pivot axis of said pivot means.

12. A rotatable distributor according to claim 8, and adapted to be mounted on a floating buoy, said distributor including arm means for mooring a ship to the disributor, a. said mooring arm being connected to said rotating dome and including means for movably supporting the arm on a circular movement track on said platform, said mooring arm and said conduit-carrying arm forming an angle between them, and b. a balancing arm arranged in the excluded angle of said two first-mentioned arms and a counter weight mounted on said balancing arm to hold said platform substantially horizontally.

* * * * *